Aug. 12, 1969     W. L. COLEMAN ET AL     3,461,025
DECORATIVE FIBER GLASS PRODUCT AND PROCESS FOR MAKING SAME
Original Filed June 9, 1965
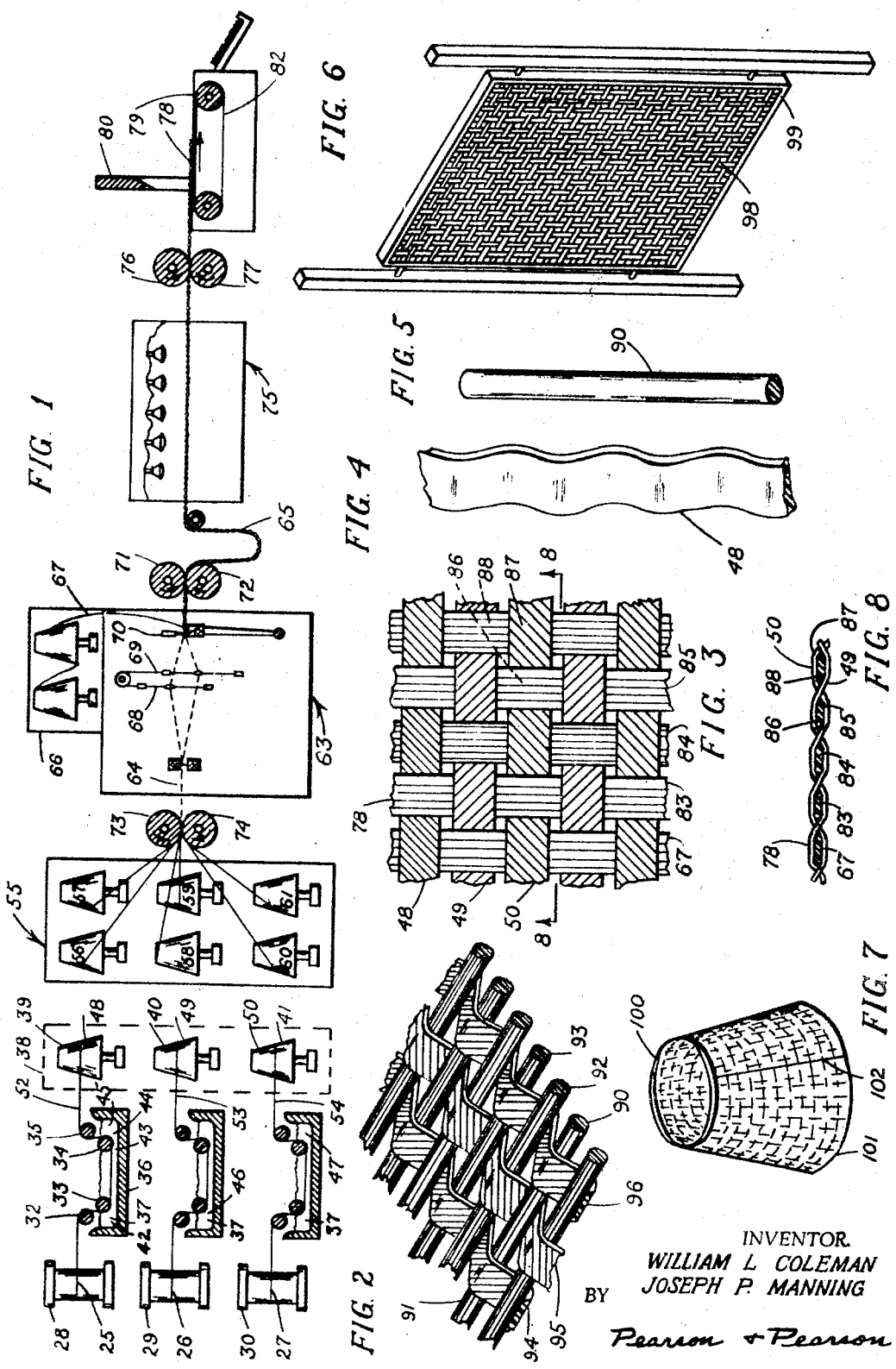
INVENTOR.
WILLIAM L COLEMAN
JOSEPH P. MANNING
BY Pearson & Pearson
ATTORNEYS

United States Patent Office 3,461,025
Patented Aug. 12, 1969

3,461,025
DECORATIVE FIBER GLASS PRODUCT AND PROCESS FOR MAKING SAME
William L. Coleman and Joseph P. Manning, both of Jaffrey, N.H. 03454
Continuation of abandoned application Ser. No. 462,499, June 9, 1965. This application Dec. 6, 1966, Ser. No. 599,650
Int. Cl. B32b 17/04; D06m 13/34
U.S. Cl. 161—91                                   2 Claims

ABSTRACT OF THE DISCLOSURE

A woven, pliant, self-supporting sheet for structural or decorative panel use, the sheet being formed of translucent fiber glass roving criss-cross strands, each strand having individual color, by reason of pigments impregnated and anchored therein, at least one set of cross strands being of flattened cross section, and all intersections of the criss-cross strands being anchored to each other by the polymerization of thermoset resin pre-impregnated into the strands. The method includes the steps of forming translucent fiber glass roving soaked in a colored thermoset resin and having a predetermined shelf life, interweaving such strands with tension on the warp and then supporting the weave through an oven to polymerize the strands and bond the intersections.

---

This application is a continuation of Ser. No. 462,499, filed June 9, 1965, now abandoned.

This invention relates to a woven, pliant, self-supporting decorative, reinforced fiber glass plastic web, sheet or panel, and to a process for making the same.

It is well known to make rigid, solid panels of fiber glass, filler and thermoset resin or other rigid fiber glass reinforced plastic articles. It is also will known to make flexible fabrics of fiber glass, for example fabrics woven from fiber glass yarns or fiber glass rovings. Continuous or spun rovings are woven into coarse, heavy drapeable fabrics, which may be used in the manufacture of boats, swimming pools and the like as a reinforcing layer. However, while fugitive dyes are sometimes added to the roving and later scoured therefrom, such woven rovings have not had a permanent, decorative, colored weave pattern, and have had to be either dyed a uniform color in the piece or have had to be printed with a decorative pattern.

In the production of flexible, woven fiber glass cloth, it has been proposed in United States Patent No. 3,068,546 to Caroselli et al. of Dec. 18, 1962, to pass yarn through a dispersion of inorganic pigments, then weave the yarn into fabric and then heat the fabric to about 1200° F., to relax the yarn and set the weave. It has also been proposed in United States Patent No. 3,117,052 to Horton of Jan. 7, 1964, to secure multicolored glass fiber fabrics by weaving with yarns which differ in capillarity so that the yarns may vary in pigment absorption after weaving to achieve a decorative, colored pattern. The products disclosed in these patents are cloth fabrics with the usual cloth characteristics of lack of bonding at the weave intersections, easy flexibility and drapeability, inability to self support, and lack of rigidity.

In this invention, on the other hand, the woven roving product is a pliant self-supporting web, grid sheet or panel, formed of cured, polymerized, thermosetting resin impregnated, pliant, self-supporting warp and filling strands, each having selected colored pigments firmly anchored in the strand and having a firm cured resin bond at all strand intersections. The process of the invention is performed by pre-impregnating individual warp and filling strands of fiber glass roving with a polyester or epoxy resin which has been catalyzed to not cure or polymerize under room conditions for a predetermined period, but which will cure rapidly with the addition of heat. In the resin mix for such strands, pigments of desired colors are uniformly dispersed to take part in the polymerization, or curing stage. The various pre-preg colored strands may thus be wound into packages and the packages stored on creels, while remaining sticky tacky, flexible and only partially cured, and may be woven in this condition. After weaving, the resulting woven fabric is heated to the curing, or polymerizing temperature of the resin, in the absence of pressure, to form a pliant semi-rigid, self-supporting woven roving sheet, having a predetermined weave pattern in individually and uniformly colored warp and filling strands and having the strands bonded to each other at the weave intersections. The sheet is not limp in the manner of cloth, and while pliant, and capable of bending within its elastic limit it will fracture at the fold line, if folded The material can be curled into a cylinder of one or two feet in diameter to form a lamp shade, but tends to remain in the planar configuration in which it was cured The principal object of the invention is to provide a pliant, self-supporting, reinforced, fiber glass woven panel in which each of the individual warp or filling strand may be of any desired color, independent of the others and in which all colors are uniformly dispersed in thermoset resin which unifies, solidifies, or rigidifies the strands Another object of the invention is to provide such a panel in which the filling strands are straight and in a single plane, but the warp strands are undulated over and under the filling strands, to provide a pleasing and unusual decorative effect.

A further object of the invention is to provide such a panel in which the warp strands are undulated and flattened in cross section and the filling strands are straight and of round cross section.

Other objects and advantages of the invention will be apparent from the claims, the description of the drawing and from the drawing in which:

FIGURE 1 is a diagrammatic side elevation illustrating the process of the invention.

FIGURE 2 is a fragmentary perspective view of a woven panel of colored, resin impregnated fiber glass roving warp and filling strands, the strands being cross hatched to designate individual and different colors, and one set of strands being straight and of round cross section.

FIGURE 3 is a plan view of a fragment of a woven fiber glass panel constructed in accordance with the invention and having undulated, solidified filling strand of flat cross section interwoven with undulated, solidified warp strands of flat cross section.

FIGURE 4 is an enlarged detail view of one of the self-supporting, unified, cured, undulated fiber glass roving warp strands.

FIGURE 5 is a view similar to FIGURE 4 of one of the solidified straight, fiber glass roving filling strands FIGURE 6 is a perspective view of the novel material of the invention, used as a wall partition panel.

FIGURE 7 is a perspective view of the material bent into truncated conical shape, as in a lamp shade, and FIGURE 8 is a cross sectional view of the woven reinforced fiber glass panel shown in FIGURE 3.

Reference is made to the booklet entitled "Fiberglas Reinforced Plastics," lithographed in October 1961, an published by Owens-Corning Fiberglas Corporation of New York, N.Y., and to a booklet entitled "Glossar of Terms for Filament Winding," printed in Januar 1963, and published by the Aerospace Division of th corporation. The information contained therein is believed to be well known to those skilled in art, as it relates to fiber glass continuous roving, resins for use with fiber glass in reinforced plastics, resin mixes including fillers, monomers, catalysts, activators, inhibitors, pigments, other additives, pre-pregs, pre-preg roving, and curing temperatures.

The term "fiber glass roving" is used herein to mean one or more ends, or strands, formed of continuous filaments combined in a single unit, without twist, so that the filaments are generally parallel to each other. The term "pre-preg" is used to mean such roving impregnated with B stage thermoset resin prior to interweaving.

As shown in FIGURE 1, the first step of the process of the invention includes the assembling of a plurality of individual fiber glass rovings such as 25, 26 and 27, packaged in any suitable manner, such as on spools 28, 29 and 30, and preferably of the continuous, multi-filament, untwisted, generally parallel type. Each individual continuous roving strand is advanced under, and over, suitable rollers such as 32, 33, 34 and 35, and through a tank 36 containing a thermoset resin mix 37, and is preferably then wound on a winder 38, of known type, into individual resin impregnated packages, such as 39, 40 and 41.

Each fiber glass strand, such as 25, is of the ten to three hundred end roving type, the latter being about ¼ inch in diameter, and preferably is about sixty end roving.

In this invention, excellent results have been achieved with a reactive polyester resin which is non air inhibited and is catalyzed by a low percentage, such as 1%, of a commonly used catalyst, benzoyl peroxide, to effect a slow polymerizing cure at room temperature. Curing temperature of about 300° F. solidifies and hardens the plastic to final, stable state. An epoxy resin such as those prepared from the reaction of epichlorhydrin and polyhydric phenols and catalyzed by commonly used latent catalysts such as Lewis acid complexes, or diacyandiamide has also been found to give good results.

The resin 42 may be a polyester, an epoxy or any of the other thermoset resins. As supplied by the manufacturer, the resin contains monomer 43. A catalyst 44 such as benzoyl peroxide is included in the resin mix 37. The concentration of catalyst 44 is selected to give a pot, or shelf, life of from two or three days up to five or six weeks, to suit production needs, or an inhibitor may be included in the resin mix 37 for that purpose, so that the resin mix will remain sticky, tacky and uncured, or only partially cured, at room temperatures for a predetermined period of time sufficient to accomplish the weaving step of the process. The resin mix 37, in each tank, contains pigments such as 45, 46 and 47, each of a different color, to impart colored resin impregnation to each strand 25, 26, and 27. Pigments 45, 46 and 47 are preferably organic, for example phthalocyanine blue or green, which is bright and translucent for desirable cross linking during polymerization. In organic pigments, such as cadmium chrome oxide, which is dull and opaque, or oil soluble dies such as anthraquinone, while usable, tend not to produce as strong a finished product as do organic pigments.

It will be seen that the packages 39, 40 and 41 thus constitute an assemblage of a plurality of individual fiber glass rovings, 48, 49 and 50, each having coated thereon, and impregnated into the interstices thereof, a synthetic, organic thermoset resin 52, 53, or 54, each resin containing a uniform dispersion of pigments 45, 46 or 47, and each in B, or pre-preg, stage catalyzed to not cure for a predetermined time. The strands 48, 49, and 50, are sticky, tacky, flexible and only partially cured, but the resin is a sufficient lubricant to permit the strands to be formed into a fabric.

The individual packages of individually colored, prepreg strands of fiber glass roving, impregnated with B stage thermoset resin, such as 39, 40 and 41 are, conveniently, mounted on a creel 55, of known type. The colored strands may then be wound onto a warp beam, with or without disc separators between the windings for subsequent mounting in a loom for weaving. Preferably, however, the strands are fed directly from creel to loom without warping. As shown in FIGURE 1, a suitable number of such packages 56, 57, 58, 59, 60, and 61, are used to supply the loom 63. The strands from the creel 55 form the warp 64 of the woven fabric 65, each strand being in an individual uniformly dispersed color, to form the desired weave pattern. A second creel 66, or any other suitable supply means, supplies the filling 67 to loom 63 for interweaving with the warp 64, the filling 67 being impregnated in the same manner as strands 39, 40, and 41, but in selected colors according to the desired weave pattern.

It will be understood that the organic resinous binder and colored pigments in the strands are not intended to be later removed by intense heat, but are physically and chemically anchored into a unitary assembly by the heat exposure during curing of the resin.

The loom 63 includes the usual harnesses 68 and 69 for creating a shed for the passage of the filling, and operates continuously to produce the woven, B stage, resin-impregnated decorative fabric 65. Instead of the usual loom wind-up roll, a pair of driven nip rolls 71 and 72, rotating in the direction of the arrows, are provided to advance the woven fabric while maintaining tension on the warp strands in cooperation with rolls 73 and 74. The tension on the warp strands tends to flatten them from their original round cross section as shown in FIGURES 2 and 3. The filling strands, such as 67, may be beaten up tightly to form the close mesh of FIGURE 2, by the conventional loom reed mechanism 70, or less tightly to form the open mesh weave of FIGURE 6, in order to produce various decorative effects.

After the step of forming the strands into a fabric, such as woven fabric 65, the fabric is passed through a suitable resin curing oven 75 for polymerizing the resin in the absence of pressure, other than atmospheric pressure. Oven 75 may be of any well-known type, such as infra red bulb, steam pipe, electric resistance unit or coil, etc., for curing, or polymerizing, the resin at a temperature of about 300–320° F. The impregnated fabric is drawn into the oven by the driven feed rolls 76 and 77, operating intermittently, to pull a festooned, or slacked, stretch of the fabric web 65 fully into the oven, and then to dwell therein for the exposure time required for the particular resin, or operating continuously at a rate such that the time required for passage through the oven will be equal to the time required for curing the panel.

It will be understood that the flexible woven, meshed web 65 can be draped or shaped to various configurations, prior to curing, if desired. However, as shown in FIGURE 1, to produce a flat decorative sheet, or panel, 78, the web 65 is flatwise supported in the oven and discharged therefrom onto the horizontal table 79, where it is cut into desired sizes by knife 80, and may be carried away by a stacking apron 82.

The decorative, woven, reinforced fiber glass sheet 78, formed by the process of the invention, as shown fragmentarily in FIGURE 3 and FIGURE 8, is cross hatched to indicate the individual colored pigments anchored in the cured resin of each warp strand, 48, 49, and 50, and in each filling strand 67, 83, 84, and 85. Since the strands of sheet 78 were inter-woven while the resin was not yet cured and hardened, each strand has been hardened in the undulated condition shown at 48 in FIGURE 4. The strands are also flattened, as shown. Each undulated strand, if removed from the weave, is bendable, flexible, resilient, and self-supporting, and the woven fabric sheet is also bendable, flexible, resilient, and self-supporting. In this form of the invention, the filling strands are solidified and undulated over and under the warp strands, and the warp strands are solidified and undulated over and under the filling strands. In addition, any open mesh pattern of the woven material is maintained, by reason of the cross linked, polymerized bonds, such as 86, 87, and 88, at each weave intersection, where the resin of the warp strands is firmly coalesced, anchored and bonded to the resin of the filling strands by the polymerized thermoset resin.

Alternatively, instead of manually, or automatically, interweaving flexible, partially polymerized filling strands into the warp strands, the impregnated, colored, fiber glass strands, such as 67, may be polymerized in oven 75 into self-supporting, cylindrical straight rods such as shown at 90 in FIGURE 5. A plurality of such straight rods may then be inserted successively in the sheds formed by the harnesses 68 and 69 of loom 63, each rod being of a different color in accordance with a predetermined weave pattern. The resulting woven web of partially polymerized, limp, flexible warp strands and polymerized, solidified, self-supporting straight filling strands is then passed through the oven 75, the warp strands cured in undulated configuration, and the heat of the oven causing a bonding at the weave intersections.

As shown in FIGURE 2, the woven, open-meshed fiber glass sheet 91, resulting from this alternative step, has polymerized, straight, colored fillings such as 90, 92 and 93, with the polymerized warp strands 94, 95, and 96, undulated over and under the filling strands. The round cross section of the fillings gives a novel and decorative appearance in contrast to the flattened warp strands 94, 95 and 96.

Because of the hardened resin coating on each strand of the decorative woven fabric of the invention, capillarity is uniform and color is anchored in place, regardless of scourings or other after treatment. The panels have desirable structural properties, usable in the building construction industry as wall panels or window screens, in the furniture industry as panels in cupboards, chairs or room dividers, and in the lighting industry as diffuser panels for cove lights, ceiling lights, or as lamp shades.

A typical self-supporting sheet 98 of the material of the invention is shown in FIGURE 6, in use as a decorative partition panel. Where the filling strands are not looped back upon themselves to form a selvedge, as in the material of FIGURE 2, a frame 99 is provided around the sheet to cover the edge. The semi-rigid, but pliant sheet 98 is self-supporting without the frame, however. The material may be bent into cylindrical, or truncated conical form of about one foot in diameter, as shown in FIGURE 7, to form a translucent lamp shade or the like. In this case, it is edged at 100 and 101 by suitable tape material and the seam 102 may be closed in any convenient manner such as butt seam or lapped seam with adhesive, stitched tape or the like.

In the woven, decorative material of the invention, if a single warp or filling strand is removed from the polymerized sheet, it will be found to be self-supporting, pliant, and resilient, the strand being relatively thick and heavy, whether of flattened or cylindrical cross section. The colored pigments and inherent translucence of each strand, give it a decorative appearance which is in no way dependent upon the color of any other strand within the sheet, except by choice.

If desired, the impregnated colored, fiber glass rods, such as 90, may be laid on the partially polymerized warp strands 48, 49 and 50, to form two angularly disposed groups of strands, and then polymerized in oven 75 to form a non-woven, decorative fabric, resin bonded at each crossing point of the strands.

We claim:
1. A substantially self-supporting, pliant, semi-rigid, structural sheet, or panel, comprising:
   a set of individually, self-supporting, pliant, semi-rigid, translucent, colored, warp strands interwoven with a set of individually, self-supporting, pliant, semi-rigid, translucent, colored, filling strands and forming a decorative, colored, open-mesh, weave pattern;
   each said strand being of relatively thick, fiber glass roving comprising a multiplicity of generally parallel, continuous filaments solidified into a unit by, having coated therearound, and having impregnated into the interstices thereof, a polymerized, translucent, thermoset polyester or epoxy resin, said polymerized, translucent, resin containing a uniform dispersion of colored pigment producing an independent color for each said strand;
   at least one set of said strands being each of flat, generally rectangular cross section and bent partially around a strand of the other said set, at the intersection thereof, with a substantial area of intimate surface contact therewith at said intersection, and
   the intersections of the strands of said sets of warp and filling strands being each firmly coalesced, anchored and molecularly bonded to each other, over the entire said substantial area of intimate surface contact, by said polymerized, thermoset resin,
   said sheet having no drapability or foldability but having bendability such that it may be bent into a minimum diameter as small as one foot and said strands being of predetermined cross sectional area in the range of one tenth of an inch diameter to one quarter of an inch diameter.

2. A translucent, structural sheet, or panel, as specified in claim 1, wherein:
   the strands of said filling set are all in a single plane, each strand is straight for the full length thereof, and of circular cross section, and the opposite terminal end of each said strand is free of selvedge loops.

References Cited
UNITED STATES PATENTS

| | | | |
|---|---|---|---|
| 3,214,324 | 10/1965 | Peerman | 161—185 |
| 2,979,431 | 4/1961 | Peravlt | 156—244 |
| 2,929,738 | 3/1960 | Bateson et al. | 117—103 |
| 2,867,891 | 6/1959 | Horton et al. | 28—73 |

ROBERT F. BURNETT, Primary Examiner

M. A. LITMAN, Assistant Examiner

U.S. Cl. X.R.

156—161; 161—93, 97, 185, 195